(12) United States Patent
Gamboa et al.

(10) Patent No.: US 11,136,773 B2
(45) Date of Patent: Oct. 5, 2021

(54) SYSTEMS AND METHODS FOR MANAGING BODIES OF WATER

(71) Applicant: Rheem Manufacturing Company, Atlanta, GA (US)

(72) Inventors: Jorge Miguel Gamboa, Oxnard, CA (US); Terence Sean Doyle, Oak Park, CA (US); Juan Carlos Montanez, Oxnard, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 42 days.

(21) Appl. No.: 16/542,958

(22) Filed: Aug. 16, 2019

(65) Prior Publication Data

US 2021/0047853 A1 Feb. 18, 2021

(51) Int. Cl.
*E04H 4/14* (2006.01)
*E04H 4/12* (2006.01)

(52) U.S. Cl.
CPC .............. *E04H 4/14* (2013.01); *E04H 4/129* (2013.01); *E04H 4/1245* (2013.01); *E04H 4/1254* (2013.01); *E04H 4/1272* (2013.01); *E04H 4/1281* (2013.01); *E04H 4/148* (2013.01)

(58) Field of Classification Search
None
See application file for complete search history.

(56) References Cited

U.S. PATENT DOCUMENTS 7,043,341 B2   5/2006   Gallupe et al.
7,292,898 B2 * 11/2007   Clark ................. G05B 19/0428
                                                                700/9

FOREIGN PATENT DOCUMENTS

CA      2361386      7/2000
CN    104635650      5/2015

* cited by examiner

*Primary Examiner* — Carlos R Ortiz Rodriguez
(74) *Attorney, Agent, or Firm* — Troutman Pepper Hamilton Sanders LLP

(57) ABSTRACT

A managed water system can include a first body of water contained in a vessel. The managed water system can also include at least one sensor device that measures at least one parameter associated with the first body of water. The managed water system can further include a circulation system that circulates the body of water relative to the vessel. The managed water system can also include a controller communicably coupled to the at least one sensor device and the circulation system. The controller can control the circulation system, and receive measurements of the at least one parameter made by the at least one sensor device. The controller can also evaluate the measurements using multiple algorithms, and communicate a result of evaluating the measurements.

19 Claims, 9 Drawing Sheets

SYSTEMS AND METHODS FOR MANAGING BODIES OF WATER

TECHNICAL FIELD

The present disclosure relates generally to swimming pools, and more particularly to systems, methods, and devices for providing information about and management of controlled bodies of water (e.g., swimming pools, spas, fountains).

BACKGROUND

The heat up duration of a spa, swimming pool, or other controlled body of water varies, depending on a number of factors (e.g., heating capacity, the volume/mass of water). This process of heating such a body of water can be quite long and expensive. Also, oftentimes when heating such a body of water is occurring, little to no effort is made to optimize the use of the equipment involved in the process.

SUMMARY

In general, in one aspect, the disclosure relates to a managed water system. The managed water system can include a body of water contained in a vessel. The managed water system can also include at least one sensor device that measures at least one parameter associated with the body of water. The managed water system can further include a circulation system that circulates the body of water relative to the vessel. The managed water system can also include a controller communicably coupled to the at least one sensor device and the circulation system. The controller can control the circulation system. The controller can also receive a plurality of measurements of the at least one parameter made by the at least one sensor device. The controller can further evaluate the plurality of measurements using a plurality of algorithms. The controller can also communicate a result of evaluating the plurality of measurements.

In another aspect, the disclosure can generally relate to a controller for a managed water system. The controller can include a control engine that is configured to control a circulation system that circulates a body of water relative to a vessel. The control engine can also be configured to receive a plurality of measurements of at least one parameter associated with the body of water as measured by at least one sensor device. The control engine can further be configured to evaluate the plurality of measurements using a plurality of algorithms. The control engine can also be configured to communicate a result of evaluating the plurality of measurements.

In yet another aspect, the disclosure can generally relate to a non-transitory computer-readable medium comprising instructions that, when executed by a hardware processor, perform a method for evaluating a portion of a managed water system. The method can include controlling a circulation system that circulates a body of water relative to a vessel. The method can also include receiving a plurality of measurements of at least one parameter associated with the body of water as measured by at least one sensor device. The method can further include evaluating the plurality of measurements using a plurality of algorithms. The method can also include communicating a result of evaluating the plurality of measurements.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1A:
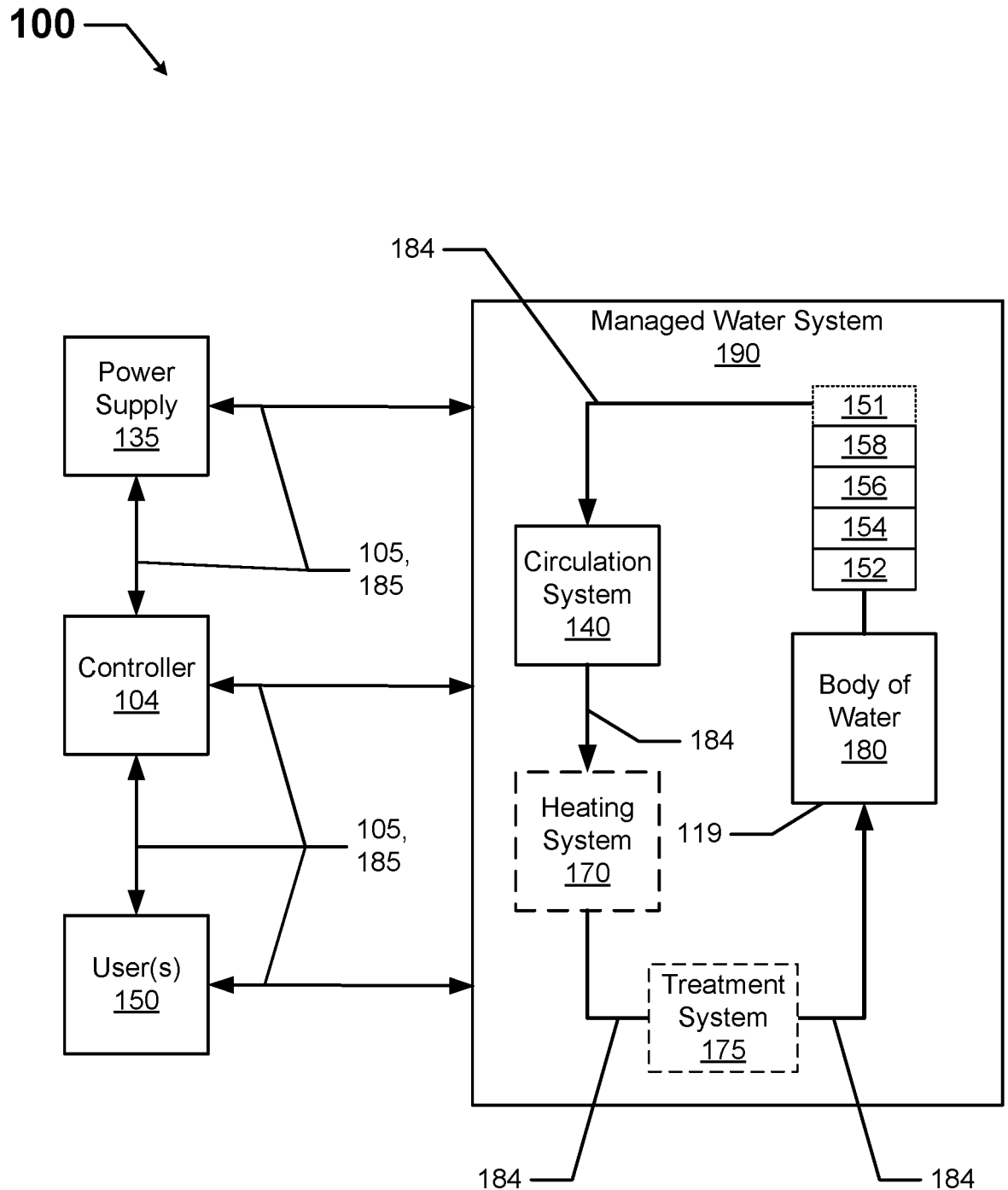
FIGS. 1A and 1B show diagrams of a system that includes a swimming pool and a controller in accordance with certain example embodiments.

In general, example embodiments provide systems, methods, and devices for determining information about and enabling the management of a swimming pool, a spa, and/or some other controlled body of water. Example embodiments can be used for any size (e.g., capacity) of a controlled body of water. Further, example embodiments can be used with a controlled body of water for any application (e.g., commercial, residential, industrial). A controlled body of water can be used for any of a number of purposes, including but not limited to recreation, sustaining life, and commercial production. In addition, example embodiments can be used with any type of heating system, including but not limited to electric heaters, gas heaters, geothermal heaters, and heat pump heaters.

A controlled body of can refer to the application of heat, chemicals, and/or some other process to a body of water. In some cases, particularly for commercial and industrial applications, example embodiments can be used for a liquid aside from water. In other words, example embodiments can be used to manage the temperature, chemical make-up, and/or other characteristic of non-water liquids.

Example embodiments can make a number of determinations with respect to a controlled body of water. For instance, example embodiments can determine the capacity (e.g., in gallons) of a controlled body of water. As another example, example embodiments can determine how long it will take to heat a controlled body of water to a particular temperature. As yet another example, example embodiments can determine the cost of heating a controlled body of water. As still another example, example embodiments can provide advice as to whether the existing equipment (e.g., pump motor, heater) is sufficient for servicing a controlled body of water. As yet another example, example embodiments can analyze the chemistry of a controlled body of water and recommend a treatment plan for the controlled body of water.

Example embodiments can also take one or more actions to implement a recommendation based on conclusions reached by an example system. For example, example embodiments can control motors, valves, heaters, and other equipment to bring the water temperature of a controlled body of water to a particular temperature by a particular point in time in the most cost-effective manner. As another example, example embodiments can control the quantity, type, and timing of one or more chemicals added to a controlled body of water to bring certain parameters (e.g., chlorine, pH, phosphates) within a particular range of values.

Systems for managing bodies of water (or components thereof, including controllers) described herein can be made of one or more of a number of suitable materials to allow that system and/or other associated components of the system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of a system (or portions thereof) for managing bodies of water described herein can be made from a single piece (as from a mold, injection mold, die cast, or extrusion process). In addition, or in the alternative, components of a system (or portions thereof) for managing bodies of water can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of systems and methods for managing bodies of water, one or more of the components shown may be omitted, repeated, and/or substituted. Accordingly, example embodiments of systems and methods for managing bodies of water should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three-digit number, and corresponding components in other figures have the identical last two digits.

In some cases, example embodiments can be subject to meeting certain standards and/or requirements. Examples of entities that set and/or maintain standards include, but are not limited to, the Pool and Hot Tub Alliance (PHTA), the Association of Pool and Spa Professionals (APSP), the Department of Energy (DOE), the National Electric Code (NEC), the National Electrical Manufacturers Association (NEMA), the International Electrotechnical Commission (IEC), the American Society of Mechanical Engineers (ASME), the American National Standards Institute (ANSI), the American Society of Heating, Refrigeration and Air Conditioning Engineers (ASHRAE), Underwriters' Laboratories (UL), the American Society of Testing and Materials (ASTM), and the Institute of Electrical and Electronics Engineers (IEEE). Use of example embodiments described herein meet (and/or allow a corresponding system or portion thereof to meet) such standards when required.

Example embodiments of systems and methods for managing bodies of water will be described more fully hereinafter with reference to the accompanying drawings, in which example embodiments of systems and methods for managing bodies of water are shown. Systems and methods for managing bodies of water may, however, be embodied in many different forms and should not be construed as limited to the example embodiments set forth herein. Rather, these example embodiments are provided so that this disclosure will be thorough and complete, and will fully convey the scope of systems and methods for managing bodies of water to those of ordinary skill in the art. Like, but not necessarily the same, elements (also sometimes called components) in the various figures are denoted by like reference numerals for consistency.

Terms such as "first", "second", "third", "top", "bottom", "side", and "within" are used merely to distinguish one component (or part of a component or state of a component) from another. Such terms are not meant to denote a preference or a particular orientation. Such terms are not meant to limit embodiments of systems and methods for managing bodies of water. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
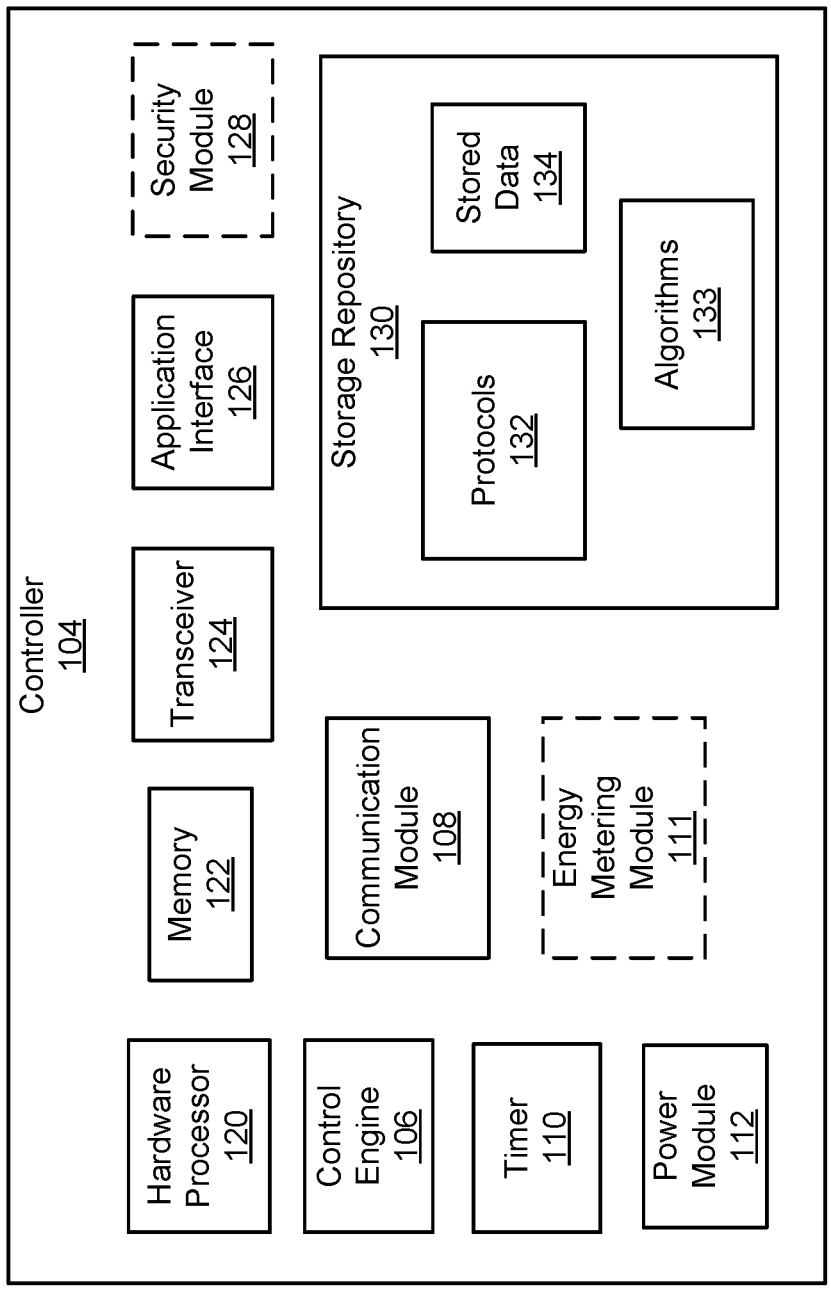

FIGS. 1A and 1B show diagrams of a system 100 that includes a managed water system 190 that is controlled (or at least monitored) by a controller 104 in accordance with certain example embodiments. Specifically, FIG. 1A shows the overall system 100 that includes the managed water system 190, and FIG. 1B shows a detailed system diagram of the controller 104. As shown in FIGS. 1A and 1B, the system 100 can include the managed water system 190, the controller 104, a power supply 135, and one or more users 150. The managed water system 190 includes a one or more bodies of water 180, a circulation system 140, an optional heating system 170, and an optional treatment system 175 that are connected to each other in a loop by a piping system 184. The optional heating system 170 and the optional treatment system 175 can generally be referred to as ancillary systems. Within the piping system 184 can be one or more sensors 151 (e.g., temperature sensors 158, flow sensors 154, water chemistry sensors 156) and one or more valves 152.

As shown in FIG. 1B, the controller 104 can include one or more of a number of components. Such components, can include, but are not limited to, a control engine 106, a communication module 108, a timer 110, an optional energy metering module 111, a power module 112, a storage repository 130, a hardware processor 120, a memory 122, a transceiver 124, an application interface 126, and, optionally, a security module 128. The components shown in FIGS. 1A and 1B are not exhaustive, and in some embodiments, one or more of the components shown in FIGS. 1A and 1B may not be included in an example system. Further, one or more components shown in FIGS. 1A and 1B can be rearranged. For example, the controller 104 can be part of the managed water system 190. Any component of the system 100 can be discrete or combined with one or more other components of the system 100.

A user 150 may be any person or entity that interacts with the managed water system 190 and/or the controller 104. Examples of a user 150 may include, but are not limited to, an engineer, an appliance or process that uses heated water, an electrician, an instrumentation and controls technician, a mechanic, an operator, a consultant, a pool maintenance operator, a pool/spa designer, a park management employee, an electric utility, a grid operator, a retail electric provider, an energy marketing company, load forecasting software, a weather forecasting service, a labor scheduling system, a contractor, a homeowner, a landlord, a government entity (e.g., a municipal parks and recreation department), a hotel manager, a building management company, and a manufacturer's representative. There can be one or multiple users 150 at any given time.

The user 150 can use and/or include a user system (not shown, but such as a smart phone or a laptop computer), which may include a display (e.g., a GUI). A user 150 can interact with (e.g., send data to, receive data from) the controller 104 via the application interface 126 (described below). A user 150 can also interact with the managed water system 190 (including any components thereof, such as one or more of the sensor devices 151, the circulation system 140, and the optional treatment system 175) and/or the power supply 135. Interaction between a user 150, the controller 104, the managed water system 190, and the power supply 135 is conducted using signal transfer links 105 and/or power transfer links 185.

Each signal transfer link 105 and each power transfer link 185 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, Zigbee, mobile apps, text/email messages, cellular networking, Bluetooth, WirelessHART, ISA100) technology. For example, a signal transfer link 105 can be (or include) one or more electrical conductors that are coupled to the controller 104 and to a sensor device 151 of the managed water system 190. A signal transfer link 105 can transmit signals (e.g., communication signals, control signals, data) between the controller 104, a user 150, the managed water system 190 (including components thereof), and/or the power supply 135.

Similarly, a power transfer link 185 can transmit power between the controller 104, a user 150, the managed water system 190 (including components thereof), and/or the power supply 135. One or more signal transfer links 105 and/or one or more power transfer links 185 can also transmit signals and power, respectively, between components (e.g., temperature sensor 158, flow sensor 154, heating system 170) within the managed water system 190 and/or within the controller 104.

The power supply 135 provides power, directly or indirectly, to one or more components (e.g., the sensor devices 151, the controller 104, the heating system 170, a system of a user 150) of the system 100. The power supply 135 can include one or more components (e.g., a transformer, a fuse) that receives power (for example, through an electrical cable) from an independent power source external to the heating system 100 and generates power of a type (e.g., AC, DC) and level (e.g., 240V, 120V) that can be used by one or more components of the system 100. For example, the power supply 135 can provide 240VAC power to the heating system 170 of the managed water system 190. In addition, or in the alternative, the power supply 135 can be or include a source of power in itself. For example, the power supply 135 can be or include a battery, a localized photovoltaic power system, or some other source of independent power.

The managed water system 190 is a system having one or more components that manage, in at least one way, a body of water 180 that is contained in a vessel 119. Ways in which the body of water 180 can be managed can include, but are not limited to, circulating the body of water 180, measuring a parameter (e.g., temperature, flow rate, pH) of the body of water 180, heating the body of water 180, and chemically treating the body of water 180. The managed water system 190 includes multiple components.

As stated above, the managed water system 190 in this example includes one or more sensor devices 151, one or more valves 152, one or more bodies of water 180, a circulation system 140, a heating system 170, and an optional treatment system 175. The managed water system 190 (including portions thereof) can be indoors, outdoors, or some combination thereof. Similarly, the managed water system 190 (including portions thereof) can be visible (e.g., above ground), hidden (e.g., buried underground), or some combination thereof. As discussed above, the managed water system 190 can include one or more bodies of water 180. (When there are multiple bodies of water 180 or multiple parts of a body of water 180, the collective group can be called a single body of water 180 herein.)

A body of water 180 has a vessel 119 that is used to hold the water. The vessel 119 of each body of water 180 can have any of a number of characteristics (e.g., shape, depth, width, curvature). The vessel 119 can be located in-ground and/or above ground. The vessel 119 can be open-ended at the top or substantially covered to enclose the water therein. The vessel 119 can be made of one or more of a number of materials, including but not limited to cement, plaster, steel, fiberglass, stone, brick, clay, rubber, and plastic. Examples of a vessel 119 can include, but are not limited to, a swimming pool, a spa, a fountain, a retention pond, a water treatment tank, a fish tank, an aquarium, a water reuse tank, a fish stocking pond, and a water storage tank.

If there are multiple bodies of water 180 in the managed water system 190, the bodies of water 180 can be isolated from each other. In addition, or in the alternative, one body of water 180 in the managed water system 190 can somehow be tied to at least one other body of water 180 in the managed water system 190. For example, one body of water 180 of a managed water system 190 can be a swimming pool, while another body of water 180 of the managed water system 190 can be an elevated spa whose excess water can flow into the swimming pool.

The circulation system 140 includes one or more of a number of components that are used to send water to and remove water from the bodies of water 180. Examples of such components can include, but are not limited to, a motor (e.g., variable speed, constant speed), a pump, a check valve, and a filter basket. The circulation system 140 works in conjunction with the piping system 184, which includes a number of pipe segments that are connected with each other to form a path for water to flow. A pipe segment of the piping system 184 can be a linear tube segment, a curved tube segment, an elbow, a junction (e.g., T-junction, Y-junction), or any other suitable component that can be used to facilitate the flow of water therethrough.

The optional heating system 170 includes one or more components that are used to heat water that flows through the piping system 184 using the circulation system 140. For example, the heating system 170 can include one or more heaters, where such heaters can be a gas-fired heater, an electric heater, a heat pump, a geothermal heater, and a solar thermal heater. The heater of a heating system 170 in some cases can include a controller that controls a temperature to which water can be heated by the heating system 170.

The optional treatment system 175 includes one or more components that treat the water flowing through the piping system 184. For example, the treatment system 175 can include a filter (e.g., a cartridge filter, a diatomaceous earth filter) that removes impurities from the water as the water, propelled by the circulation system 140, flows through the filter. As another example, the treatment system 175 can include an in-line chlorinator that adds chlorine to the water to raise the total available chlorine level in the water. The treatment system 175 can additionally or alternatively include one or more devices that add some other chemical (e.g., muriatic acid, shock, salt, conditioner, algicide) in measured amounts to the water that circulates through the piping system 184.

As discussed above, the managed water system 190 can include one or more valves 152 and one or more sensor devices 151 (e.g., temperature sensors 158, flow sensors 154, water chemistry sensors 156). Each of the sensor devices 151 can measure one or more of a number of parameters. Examples of types of sensors 151 can include, but are not limited to, temperature sensor, a pressure sensor, a flow rate sensor, a scale, a voltmeter, an ammeter, a power meter, an ohmmeter, an electric power meter, and a chemical measurement sensor. A sensor 151 can also include one or more components and/or devices (e.g., a potential transformer, a current transformer, electrical wiring) related to the measurement of a parameter.

A parameter that can be measured by a sensor 151 can include, but is not limited to, pressure, flow rate, current, voltage, power, resistance, weight, volume, a chemical trait (e.g., pH, hardness, phosphates, free available chlorine) of the water in the managed water system 190, and temperature. In certain example embodiments, the parameter or parameters measured by a sensor 151 can be used by the controller 104 to determine how long it will take before the water in the managed water system 190 reaches a particular temperature. Each sensor 151 can use one or more of a number of communication protocols. A sensor 151 can be a stand-alone device or integrated with another component (e.g., a valve 152, the heating system 170) in the system 100. A sensor 151 can measure a parameter continuously, periodically, based on the occurrence of an event, based on a command received from the control engine 106 of the controller 104, and/or based on some other factor.

Each valve 152 of the managed water system 190 can be any type of valve. Examples of types of valves can include, but are not limited to, a gate valve, a ball valve, a butterfly valve, and a diaphragm valve. A valve can be controlled manually (e.g., adjusted by a user 150) or automatically (e.g., by the controller 104). A valve can have a number of discrete positions or a range of continuous positions. A valve can any range (e.g., 90°, 180°) of operation.

Each of the various valves 152 and sensor devices 151 can be located at any point in the managed water system 190. For example, one or more valves 152 can be disposed between the circulation system 140 and the heating system 170 to control the flow of water in the piping system 184 through the heating system 170. In some cases, this can include bypassing the heating system 170 altogether. Similarly, one or more valves 152 can be disposed before or within the body of water 180 to control the flow of water in the piping system 184 through the body of water 180. In some cases, this can include bypassing a part (e.g., a swimming pool in favor of a spa) of the body of water 180 altogether.

The heating system 170 of the water heater 190 can include one or more devices (or components thereof) that consume energy (e.g., electricity, natural gas, propane) during operation. An example of such a device or component of the heating system 170 can include, but are not limited to, heating elements, a heat exchanger, an inducer, and a blower. Those of ordinary skill in the art will appreciate that the heating system 170 can have any of a number of configurations. In any case, the controller 104 can be aware of the devices, components, ratings, positioning, and any other relevant information regarding the heating system 170. In some cases, one or more devices of the heating system 170 can have its own local controller. In such a case, the controller 104 can communicate with the local controller of the heating system 170 using signal transfer links 105 and/or power transfer links 185.

A user 150, the power supply 135, and/or the managed water system 190 (including portions thereof, such as sensors 151) can interact with the controller 104 using the application interface 126 in accordance with one or more example embodiments. Specifically, the application interface 126 of the controller 104 receives data (e.g., information, communications, instructions, updates to firmware) from and sends data (e.g., information, communications, instructions) to a user 150, the power supply 135, and/or the managed water system 190. The users 150, the power supply 135, and the managed water system 190 (including portions thereof) can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof. For example, referring to FIG. 2 below, the controller 104 can include a user interface having one or more of a number of I/O devices 216 (e.g., buzzer, alarm, indicating light, pushbutton).

The controller 104, a user 150, the power supply 135, and/or the managed water system 190 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor device software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The controller 104 can be a stand-alone device or integrated with another component (e.g., the managed water system 190) in the system 100. When the controller 104 is a stand-alone device, the controller 104 can include a housing. In such a case, the housing can include at least one wall that forms a cavity. In some cases, the housing can be designed to comply with any applicable standards so that the controller 104 can be located in a particular environment (e.g., a hazardous environment, a high temperature environment, a high humidity environment).

The housing of the controller 104 can be used to house one or more components of the controller 104. For example, the controller 104 (which in this case includes the control engine 106, the communication module 108, the timer 110, the optional energy metering module 111, the power module 112, the storage repository 130, the hardware processor 120, the memory 122, the transceiver 124, the application interface 126, and the optional security module 128) can be disposed in a cavity formed by a housing. In alternative embodiments, any one or more of these or other components of the controller 104 can be disposed on a housing and/or remotely from a housing.

The storage repository 130 can be a persistent storage device (or set of devices) that stores software and data used to assist the controller 104 in communicating with a user 150, the power supply 135, and managed water system 190 (including components thereof) within the system 100. In one or more example embodiments, the storage repository 130 stores one or more protocols 132, one or more algorithms 133, and stored data 134. The protocols 132 can be any procedures (e.g., a series of method steps) and/or other similar operational procedures that the control engine 106 of the controller 104 follows based on certain conditions at a point in time. The protocols 132 can include any of a number of communication protocols 132 that are used to send and/or receive data between the controller 104 and a user 150, the power supply 135, and the managed water system 190.

A protocol 132 can be used for wired and/or wireless communication. Examples of a protocol 132 can include, but are not limited to, Econet, Modbus, profibus, Ethernet, and fiberoptic. One or more of the communication protocols 132 can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the communication protocols 132 can provide a layer of security to the data transferred within the system 100.

The algorithms 133 can be any formulas, mathematical models, and/or other suitable means of manipulating and/or processing data. One or more algorithms 133 can be used for a particular protocol 132. As discussed above, the controller 104 uses information (e.g., temperature measurements) provided by the sensor devices 151 (e.g., one or more temperature sensors 158, one or more flow sensors 154) to generate, using one or more protocols 132 and/or one or more algorithms 133, information related to the availability of heated water in the tank 195 of the managed water system 190 to a user 150.

For example, one or more protocols 132 and/or one or more algorithms 133 can dictate when a measurement is taken by a sensor device 151 and which particular sensor devices 151 take a measurement at that point in time. As another example, a protocol 132 and/or an algorithm 133 can be used, in conjunction with measurements made by one or more sensor devices 151, by the controller 104 to determine how long it will take to get the temperature of the water in one or more of the bodies of water 180 to a particular (target) temperature. This determination can be performed by the controller 104 on demand (in response to a one-time request from a user 150).

Alternatively, this determination can be performed proactively by using one or more protocols 132 and/or one or more algorithms 133. For example, if a user 150 requests that the temperature of the water of the body of water 180 be at 85° F. (a target temperature) every Saturday at noon in the months of October through April, the controller 104 can determine when and how to operate the heating system 170 and the circulation system 140 in order to have the temperature of the body of water 180 reach 85° F. every Saturday at noon in the months of October through April. The determination in this case can be based on one or more of a number of factors, including but not limited to the temperature of the water when starting the heating system 170 and the circulation system 140, the ambient temperature where the body of water 180 is located, the forecast of the ambient temperature over time leading up to noon on Saturday, and a target energy cost to get the water to the target temperature. The one or more protocols 132 and/or one or more algorithms 133 can account for these factors.

As yet another example, one or more protocols 132 and/or one or more algorithms 133 can be used to determine how much it will cost (e.g., for electricity, for natural gas, in total) to get the temperature of the water in one or more of the bodies of water 180 to a particular target temperature. As still another example, one or more protocols 132 and/or one or more algorithms 133 can be used to determine the volume (e.g., in gallons) of a body of water 180.

One or more protocols 132 and/or one or more algorithms 133 can also be used to improve maintenance and performance of the managed water system 190. For example, one or more protocols 132 and/or one or more algorithms 133 can be used to perform a chemical analysis of the body of water 180 and subsequently determine, using the previously-determined volume of the body of water 180, a treatment plan (e.g., types of chemicals to be added, quantities of chemicals to be added, order and timing of chemicals to be added) to get the water chemistry in balance. If a treatment system 175 is part of the managed water system 190, then the one or more protocols 132 and/or one or more algorithms 133 can be used to control the treatment system 175 to implement the treatment plan.

One or more protocols 132 and/or one or more algorithms 133 can be used to perform an assessment of the existing equipment (e.g., the circulation system 140, the heating system 170, the treatment system 175) to determine if improvements can be made. For example, one or more protocols 132 and/or one or more algorithms 133 can be used to suggest, assess, and quantify savings (e.g., in electricity, in chemicals) that can be realized by replacing a constant-speed motor for a pump of the circulation system 140 with a variable speed motor. As another example, one or more protocols 132 and/or one or more algorithms 133 can be used to suggest, assess, and quantify an alteration (e.g., add a heater) to the heating system 170.

In certain example embodiments, one or more protocols 132 and/or one or more algorithms 133 can be modified. Such modifications can be based on, for example, actual data, input from a user 150, information received by the controller 104 regarding other similar managed water systems, addition of equipment (e.g., motors, sensor devices 151, heaters) and/or modification to existing equipment of the managed water system 190, reconfiguration of the piping system 184, and data from other similarly-configured managed water systems 190. Such modifications to the protocols 132 and/or the algorithms 133 can be made in real time (e.g., by the controller 104).

Stored data 134 can be any data associated with the system 100 (including any components thereof), any measurements taken by the sensor devices 151, time measured by the timer 110, adjustments to an algorithm 133, threshold values, set point values, user preferences, default values, results of previously run or calculated algorithms 133, and/or any other suitable data. Such data can be any type of data, including but not limited to historical data for the system 100 (including any components thereof, such as the sensor devices 151 and the heating system 170), present data (e.g., calculations, adjustments made to calculations based on actual data, measurements taken by one or more sensor devices 151), and forecasts. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location. Some or all of the storage repository 130 can use a cloud-based platform and/or technology.

The storage repository 130 can be operatively connected to the control engine 106 of the controller 104. In one or more example embodiments, the control engine 106 includes functionality to communicate with the users 150, the power supply 135, and the managed water system 190 (including components thereof) in the system 100. More specifically, the control engine 106 sends information to and/or receives information from the storage repository 130 in order to communicate with the users 150, the power supply 135, and the managed water system 190. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., a sensor device 151, a user 150) in the system 100.

As another example, the control engine 106 can acquire the current time using the timer 110. The timer 110 can enable the controller 104 to control the heating system 170 (including any components thereof). As yet another example, the control engine 106 can direct a sensor device 151 (e.g., temperature sensor 158) to measure a parameter (e.g., temperature) and send the measurement by reply to the control engine 106.

The control engine 106 can be configured to perform a number of functions that help the controller 104 make a determination (an estimate) that relates to the amount of time it takes to heat the water in one or more bodies of water 180 of the managed water system 190 to a particular temperature. For example, the control engine 106 can execute any of the protocols 132 and/or algorithms 133 stored in the storage repository 130 and use the results of those protocols 132 and/or algorithms 133 to communicate to a user 150 the amount of it takes to heat the water in a spa (a body of water 180) of the managed water system 190 to a temperature of 105° F. This determination can be performed by the control engine 106 while the body of water 180 is being heated or in anticipation of beginning the process of heating the body of water 180.

Alternatively, this determination can be performed proactively by the control engine 106 of the controller 104. For example, if a user 150 requests that the temperature of the water of the body of water 180 be at 85° F. (a target temperature) every Saturday at noon (a target time) in the months of October through April, the controller 104 can determine when and how to operate the heating system 170 and the circulation system 140 in order to have the temperature of the body of water 180 reach 85° F. every Saturday at noon in the months of October through April. The determination in this case can be based on one or more of a number of factors, including but not limited to the temperature of the water when starting the heating system 170 and the circulation system 140, the ambient temperature where the body of water 180 is located, the forecast of the ambient temperature over time leading up to noon on Saturday, and a target energy cost to get the water to the target temperature.

In certain example embodiments, the control engine 106 of the controller 104 can use one or more protocols 132 and/or one or more algorithms 133 to determine how much it will cost (e.g., for electricity, for natural gas, in total) to get the temperature of the water in one or more of the bodies of water 180 to a particular target temperature. As still another example, the control engine 106 of the controller 104 can use one or more protocols 132 and/or one or more algorithms 133 to determine the volume (e.g., in gallons) of a body of water 180.

The control engine 106 of the controller 104 can also be used to improve maintenance and performance of the managed water system 190. For example, the control engine 106 of the controller 104 can use a protocol 132 and/or an algorithm 133 to perform a chemical analysis of the body of water 180 and subsequently determine, using the previously-determined volume of the body of water 180, a treatment plan (e.g., types of chemicals to be added, quantities of chemicals to be added, order and timing of chemicals to be added) to get the water chemistry in balance. If a treatment system 175 is part of the managed water system 190, then the control engine 106 of the controller 104 can control the treatment system 175 to implement the treatment plan.

The control engine 106 of the controller 104 can further use a protocol 132 and/or an algorithm 133 to perform an assessment of the existing equipment (e.g., the circulation system 140, the heating system 170, the treatment system 175) to determine if improvements can be made. For example, the control engine 106 of the controller 104 can suggest, assess, and quantify savings (e.g., in electricity, in chemicals) that can be realized by replacing a constant-speed motor for a pump of the circulation system 140 with a variable speed motor. As another example, the control engine 106 of the controller 104 can suggest, assess, and quantify an alteration (e.g., add a heater) to the heating system 170.

In certain example embodiments, the control engine 106 of the controller 104 can make modifications to one or more of these protocols 132 and/or algorithms 133. Such modifications can be based on, for example, actual data, input from a user 150, information received by the control engine 106 of the controller 104 regarding other similar managed water systems, addition of equipment (e.g., motors, sensor devices 151, heaters) and/or modification to existing equipment of the managed water system 190, reconfiguration of the piping system 184, and data from other similarly-configured managed water systems 190. Such modifications to the protocols 132 and/or the algorithms 133 can be made in real time by the control engine 106 of the controller 104.

The control engine 106 of the controller 104 can generate an alarm or some other form of communication when an operating parameter (e.g., temperature of a body of water 180, speed of a pump motor in the circulation system 140) exceeds or falls below a threshold value (e.g., a set point value) (in other words, falls outside an acceptable range of values). The control engine 106 can also track measurements made by a sensor device 151 (e.g., temperature sensor 158) and determine a possible present or future failure of the sensor device 151 or some other component (e.g., a motor, a heating element) of the managed water system 190.

Using one or more algorithms 133, the control engine 106 can predict the expected useful life of these components based on stored data 134, a protocol 132, one or more threshold values, and/or some other factor. The control engine 106 can also determine (e.g., using one or more sensors 151) and analyze the efficiency of the managed water system 190 over time. An alarm can be generated by the control engine 106 when the efficiency of a component of the system 100 falls below a threshold value, indicating failure of that component.

In heating a body of water 180 to a desired temperature, the control engine 106 can control one or more components (e.g., the heating system 170, a valve 152) to get the water heated more efficiently, more expeditiously, in a least-cost manner, and/or based on some other criteria.

The control engine 106 can perform its evaluation functions and resulting actions on a continuous basis, periodically, during certain time intervals, or randomly. Further, the control engine 106 can perform this evaluation for the present time or for a period of time in the future. For example, the control engine 106 can perform forecasts to determine the temperature of a body of water 180 after a specified period of time. The control engine 106 can adjust such a forecast (e.g., every hour, when new information from a user 150 or a sensor device 151 is received).

The control engine 106 can provide power, control, communication, and/or other similar signals to a user 150, the power supply 135, and the water heater 190 (including components thereof). Similarly, the control engine 106 can receive power, control, communication, and/or other similar signals from a user 150, the power supply 135, and the water heater 190. The control engine 106 can control each sensor 151, valve 152, and/or other component in the managed water system 190 automatically (for example, based on one or more algorithms 133 and/or protocols 132 stored in the storage repository 130) and/or based on power, control, communication, and/or other similar signals received from another device through a signal transfer link 105 and/or a power transfer link 185. The control engine 106 can also, in some cases, control the power supply 135. The control engine 106 may include a printed circuit board, upon which the hardware processor 120 and/or one or more discrete components of the controller 104 are positioned.

In certain embodiments, the control engine 106 of the controller 104 can communicate with one or more components (e.g., a network manager) of a system external to the system 100. For example, the control engine 106 can interact with an inventory management system by ordering a component (e.g., a sensor device 151, chemicals for the treatment system 175) to replace a failed, failing, or diminished component, as determined by the control engine 106. As another example, the control engine 106 can interact with a workforce scheduling system by scheduling a maintenance crew to repair or replace a component of the system 100 (e.g., a motor of the circulation system 140) when the control engine 106 determines that the component requires maintenance or replacement.

In certain example embodiments, the control engine 106 can include an interface that enables the control engine 106 to communicate with one or more components (e.g., a user 150, the circulation system 140) of the system 100. For example, if a user 150 operates under IEC Standard 62386, then the user 150 can have a serial communication interface that will transfer data (e.g., stored data 134) measured by the sensors 151. In such a case, the control engine 106 can also include a serial interface to enable communication with the user 150. Such an interface can operate in conjunction with, or independently of, the protocols 132 used to communicate between the controller 104 and a user 150, the power supply 135, and the managed water system 190 (or components thereof).

The control engine 106 (or other components of the controller 104) can also include one or more hardware components (e.g., peripherals) and/or software elements to perform its functions. Such components can include, but are not limited to, a universal asynchronous receiver/transmitter (UART), a serial peripheral interface (SPI), an analog-to-digital converter, an inter-integrated circuit ($I^2C$), and a pulse width modulator (PWM).

The communication module 108 of the controller 104 determines and implements the communication protocol (e.g., from the protocols 132 of the storage repository 130) that is used when the control engine 106 communicates with (e.g., sends signals to, receives signals from) a user 150, the power supply 135, and the managed water system 190 (or components thereof). In some cases, the communication module 108 accesses the stored data 134 to determine which communication protocol is used to communicate with a sensor 151 associated with certain stored data 134. In addition, the communication module 108 can interpret the communication protocol of a communication received by the controller 104 so that the control engine 106 can interpret the communication.

The communication module 108 can send and receive data between the power supply 135, the managed water system 190 (or components thereof), and/or the users 150 and the controller 104. The communication module 108 can send and/or receive data in a given format that follows a particular protocol 132. The control engine 106 can interpret the data packet received from the communication module 108 using the protocol 132 information stored in the storage repository 130. The control engine 106 can also facilitate the data transfer between the managed water system 190 (or components thereof), the power supply 135, and a user 150 by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from a user 150, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The power module 112 of the controller 104 provides power to one or more other components (e.g., timer 110, control engine 106) of the controller 104. In addition, in certain example embodiments, the power module 112 can provide power to one or more components (e.g., the heating system 170 of the water heater 190, a sensor 151, a valve 152) of the water heating system 100. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown) to measure one or more elements of power that flows into, out of, and/or within the controller 104.

The power module 112 can include one or more components (e.g., a transformer, a diode bridge, an inverter, a converter) that receives power (for example, through an electrical cable) from the power supply 135 and generates power of a type (e.g., AC, DC) and level (e.g., 12V, 24V, 120V) that can be used by the other components of the controller 104. For example, 240VAC received from the power supply 135 by the power module 112 can be converted to 12VDC by the power module 112. The power module 112 can use a closed control loop to maintain a preconfigured voltage or current with a tight tolerance at the output. The power module 112 can also protect the remainder of the electronics (e.g., hardware processor 120, transceiver 124) in the controller 104 from surges generated in the line.

In addition, or in the alternative, the power module 112 can be a source of power in itself to provide signals to the other components of the controller 104. For example, the power module 112 can be or include a battery. As another example, the power module 112 can be or include a localized photovoltaic power system. In certain example embodiments, the power module 112 of the controller 104 can also provide power and/or control signals, directly or indirectly, to one or more of the sensor devices 151. In such a case, the control engine 106 can direct the power generated by the power module 112 to one or more of the sensor devices 151. In this way, power can be conserved by sending power to the sensor devices 151 when those devices need power, as determined by the control engine 106.

The optional energy metering module 111 of the controller 104 can measure one or more components of power (e.g., current, voltage, resistance, VARs, watts) at one or more points (e.g., output of the power supply 135) associated with the system 100. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor. If there is no energy metering module 111, then the controller 104 can estimate one or more components of power using one or more algorithms 133.

The hardware processor 120 of the controller 104 executes software, algorithms 133, and firmware in accordance with one or more example embodiments. Specifically, the hardware processor 120 can execute software on the control engine 106 or any other portion of the controller 104, as well as software used by a user 150, the power supply 135, and the managed water system 190 (or portions thereof). The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the users 150, the power supply 135, and the managed water system 190 (or portions thereof). The transceiver 124 can include a transmitter, a receiver, or a combination of the two. The transceiver 124 can use wired and/or wireless technology. The transceiver 124 can be configured in such a way that the control and/or communication signals sent and/or received by the transceiver 124 can be received and/or sent by another transceiver that is part of a user 150, the power supply 135, and the managed water system 190 (or portions thereof). The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication, Zigbee, mobile apps, text/email messages, cellular networking, Bluetooth Low Energy, and Bluetooth. The transceiver 124 can use one or more of any number of suitable communication protocols (e.g., ISA100, HART) when sending and/or receiving signals. Such communication protocols can be stored in the protocols 132 of the storage repository 130. Further, any transceiver information for a user 150, the power supply 135, and the managed water system 190 (or portions thereof) can be part of the stored data 134 (or similar areas) of the storage repository 130.

Optionally, in one or more example embodiments, the security module 128 secures interactions between the controller 104, the users 150, the power supply 135, and the managed water system 190 (or portions thereof). More specifically, the security module 128 authenticates communication from software based on security keys verifying the identity of the source of the communication. For example, user software may be associated with a security key enabling the software of a user 150 to interact with the controller 104 and/or the sensors 151. Further, the security module 128 can restrict receipt of information, requests for information, and/or access to information in some example embodiments.

Figure 2:
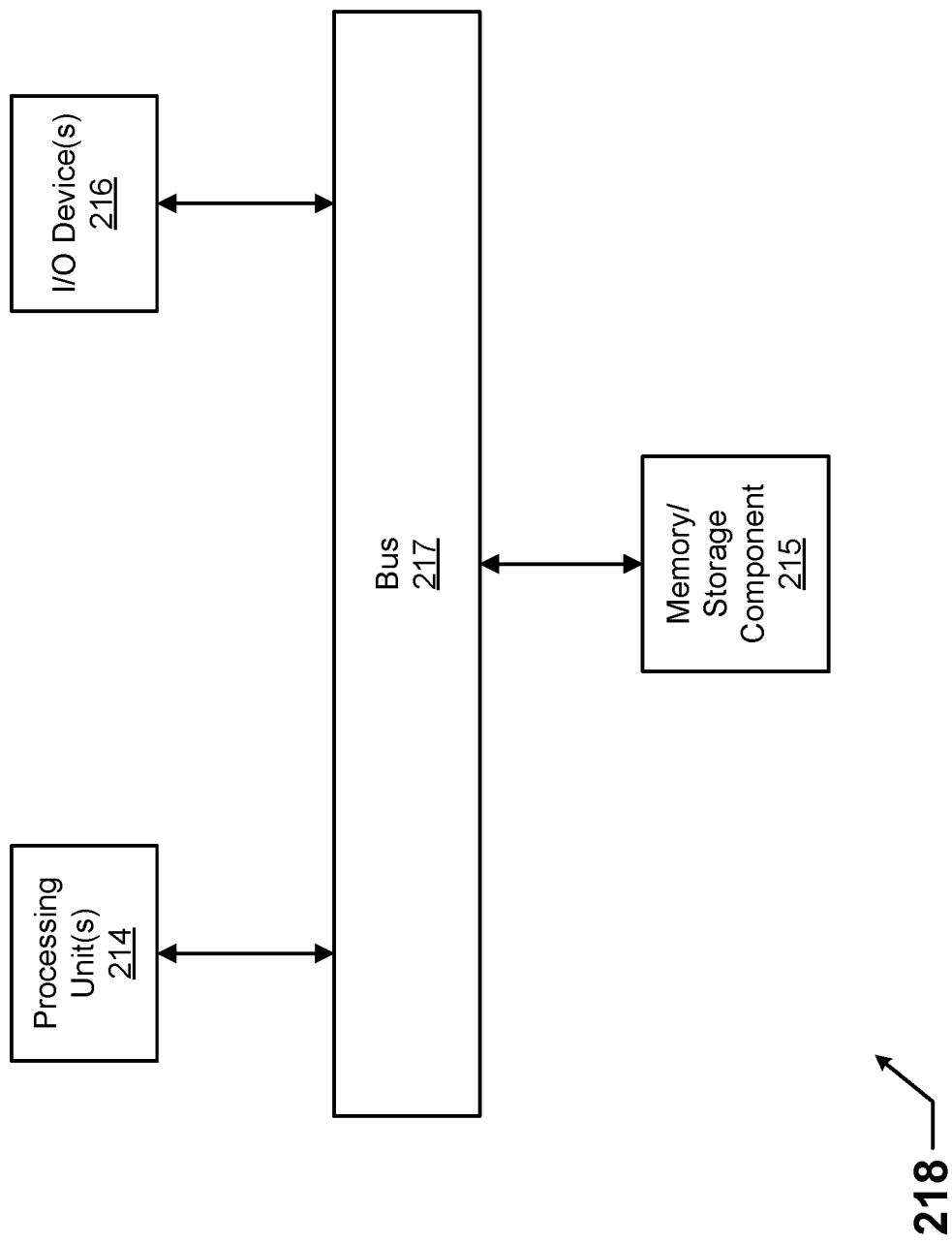
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain example embodiments. For example, the controller 104 of FIGS. 1A and 1B can be a computing device 218, and its various components (e.g., transceiver 124, storage repository 130, control engine 106) can be components of a computing device 218, as discussed below. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 218 includes at least the minimal processing, input, and/or output means necessary to practice one or more embodiments.

Further, those skilled in the art will appreciate that one or more elements of the aforementioned computer device 218 can be located at a remote location and connected to the other elements over a network in certain example embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

FIGS. 3 through 7 each show a flowchart for managing a body of water in accordance with certain example embodiments. While the various steps in these flowcharts are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. For example, the process of determining when to begin heating a body of water 180 so that a target temperature is reached at a target time, as set forth in FIG. 4, can be a discrete action or a continuous process. As a result, the START and END steps shown in FIGS. 3 through 7 can merely denote the start and end of a particular series of steps within a continuous process.

In addition, a person of ordinary skill in the art will appreciate that additional steps not shown in FIGS. 3 through 7 can be included in performing these methods in certain example embodiments. Accordingly, the specific arrangement of steps should not be construed as limiting the scope. In addition, a particular computing device, as described, for example, in FIG. 2 above, is used to perform one or more of the steps for the methods described below in certain example embodiments. For the methods described below, unless specifically stated otherwise, a description of the controller 104 performing certain functions can be applied to the control engine 106 of the controller 104. For clarity, the controller 104 described herein can control other aspects of the system 100 while performing the functions described above and in the methods of FIGS. 3 through 7 below. For example, the controller 104 can control the power supply 135 independently of, or in conjunction with, the functions described herein.

Figure 3:
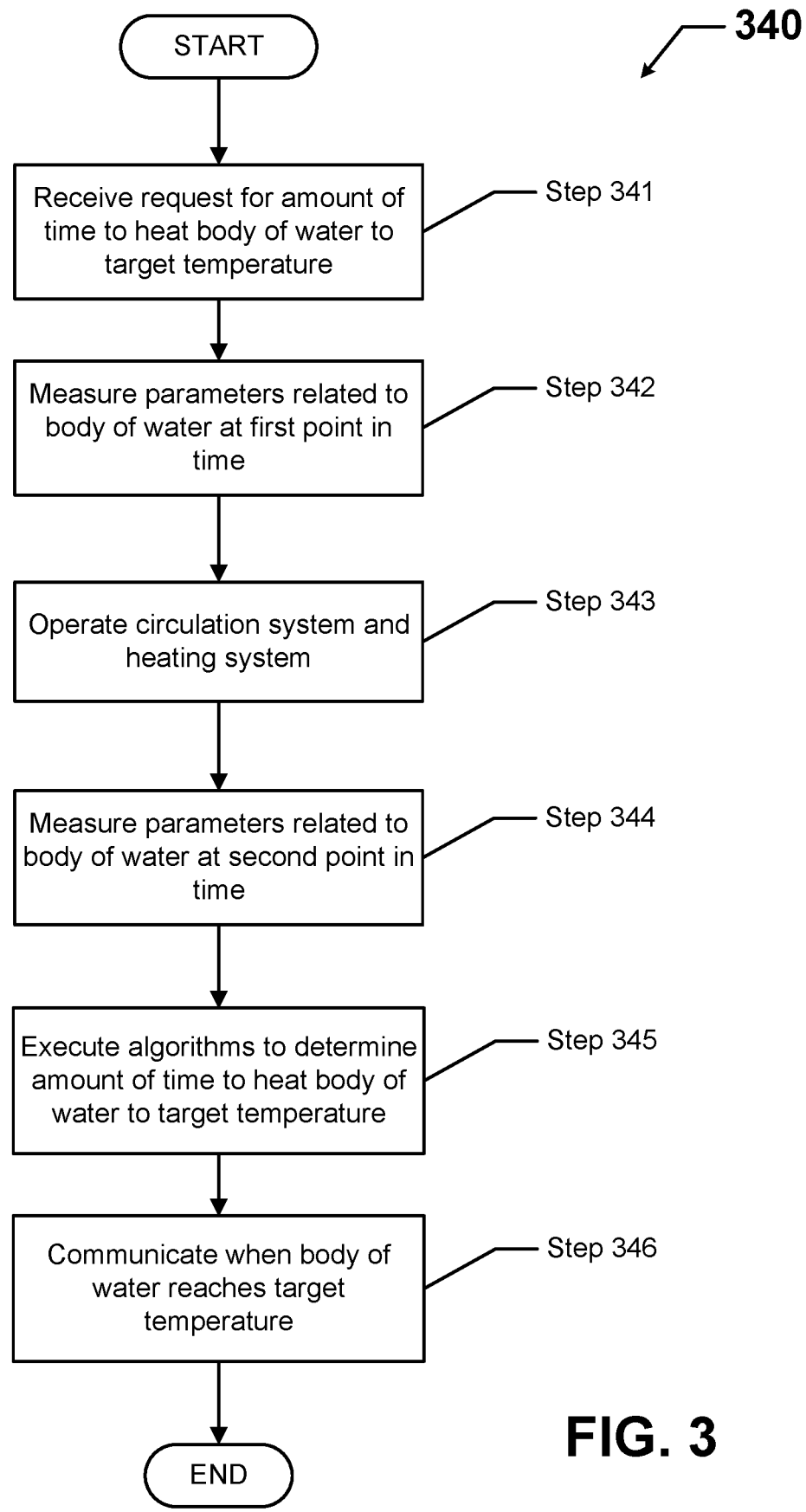
FIGS. 3 through 7 each show a flowchart for managing a body of water in accordance with certain example embodiments.

Referring to FIGS. 1A through 7, the example method 340 of FIG. 3 can be used to determine how much time it will take before a body of water 180 reaches a targe temperature. The method 340 of FIG. 3 begins at the START step and proceeds to step 341, where a request is received to determine the amount of time it takes to heat a body of water 180 to a target temperature. The request can be made by a user 150. The request can be received by the controller 104. The request can be made using one or more of any suitable communication methods, including but not limited to an email, a text message, a verbal statement, and an input on a user interface of the controller 104. The request can be received by the controller 104 using the application interface 126.

In step 342, one or more parameters related to the body of water 180 are measured at a first point in time. The parameters can be measured by one or more of the sensor devices 151 (e.g., a temperature sensor 158, a flow sensor 156). If the same parameter is measured by multiple sensor devices 151, then those sensor devices 151 can be placed at different locations within the managed water system 190. For example, one temperature sensor 158 can be placed near a part of the piping system 184 that feeds water to the vessel 119, thereby measuring the temperature of the water that flows into the vessel 119, while another temperature sensor 158 can be placed near a part of the piping system 184 that removes water to the vessel 119, thereby measuring the temperature of the water that flows out of the vessel 119. As the body of water 180 is being heated by the heating system 170, the measurements made by these two temperature sensors 158 can be different from each other, as when the set point value is higher than the temperature of the body of water 180 in the vessel 119.

A sensor device 151 can measure a parameter based on instructions received by the controller 104. Alternatively, a sensor device 151 can continually measure a parameter without instructions from the controller 104. Once the parameters are measured, the sensor devices 151 can send the measurements to the controller 104. A parameter measured by a sensor device 151 can vary, as can the number of sensor devices 151. For example, at least one temperature sensor 158 can be used in this step 342. If multiple temperature sensors 158 are used, then the measured temperature values can be averaged, treated independently, and/or processed in any other suitable way.

The time at which the parameters are measured can be marked or tracked by the timer 110. The time can be a specific point in time, a period of time (e.g., 10 minutes from when the request of step 341 is received), or some other element of time. The first point in time at which the parameters are measured can be before the implementation of step 343. In addition, or in the alternative, the first point in time at which the parameters are measured can be at the time of, or after, the implementation of step 343.

In step 343, the circulation system 135 and the heating system 170 are operated. The circulation system 135 and the heating system 170 can be initiated and operated by the controller 104. Operating the circulation system 135 can include turning on one or more pump motors so that the body of water 180 circulates between the vessel 119 and the piping system 184. Operating the circulation system 135 can also include operating (e.g., adjusting a position) one or more valves 152 to control the flow of the body of water 180 flowing through the piping system 184.

Operating the heating system 170 can include igniting or otherwise turning on one or more heaters of the heating system 170. Operating the heating system 170 can also include creating a set point (a target temperature) to which the heating system 170 will bring the temperature of the body of water 180. Operating the heating system 170 can also include adjusting (e.g., raising, lowering) the set point during the course of heating the body of water 180. When one or more valves 152 are operated, the body of water 180 flowing through the piping system 184 can be directed through the heating system 170.

In step 344, one or more parameters related to the body of water 180 are measured at a second point in time. The parameters measured at the second point in time can be the same as, or different than, the parameters measured in step 342. Further, the sensor devices 151 used to measure the parameters at the second point in time can be the same as, or different than, the sensor devices 151 used in step 342. The one or more parameters can be measured by one or more of the sensor devices 151 (e.g., a temperature sensor 158, a flow sensor 156). As in step 342, the same parameter can be measured by multiple sensor devices 151 within the managed water system 190.

A sensor device 151 can measure a parameter based on instructions received by the controller 104. Alternatively, a sensor device 151 can continually measure a parameter without instructions from the controller 104. Once the parameters are measured, the sensor devices 151 can send the measurements to the controller 104. A parameter measured by a sensor device 151 can vary, as can the number of sensor devices 151. For example, at least one temperature sensor 158 can be used in this step 344. The time at which the parameters are measured can be marked or tracked by the timer 110. The time can be a specific point in time, a period of time (e.g., 10 minutes from the first time of step 341, when the temperature measured by a temperature sensor 158 increases by 1° F.), or some other element of time.

In step 345, multiple algorithms 133 are executed to determine the amount of time it will take to heat the body of water 180 to the target temperature. The algorithms 133 can be stored in the storage repository 130. The algorithms 133 can be executed (performed) by the controller 104. Executing the algorithms 133 requires some or all of the measurements made by the sensor devices 151 and, in some cases, the set point (target temperature). An example of some algorithms 133 that can be solved sequentially are listed below.

Three theoretical principals are relied upon to use the algorithms 133 listed below. The first principal is that a British Thermal Unit (BTU) is the amount of heat energy required to raise on pound of water by 1° F. The second principal is that water weighs 8.33 pounds per gallon, and so one gallon of water requires 8.33 BTU to raise the temperature 1° F. The third principal is that the 8.33 pound weight for one gallon of water is an assumption that can vary based on factors such as, but not limited to, viscosity, density and ambient conditions.

Equation (1): $Eff=(C \times FR \times \Delta T) \div IR$, where Eff is the efficiency of the heating system 170, C is a numerical designation for the fluid in the vessel 119 (e.g., 500 for water), FR is the flow rate of the body of water 180, $\Delta T$ is a change in temperature of the body of water 180, and IR is the input rate of the fuel (e.g., natural gas, propane) used by the heater of the heating system 170. C can be calculated as the weight per gallon of the fluid times the specific heat of the fluid times a unit of time (e.g., 60 minutes). In some cases, values of C for different fluids can be listed in a lookup table (part of the stored data 134), and the user 150 can use an app on the user device 155 to select the fluid in the vessel 119. The calculated value of Eff can vary based on one or more factors, including but not limited to the speed of a pump motor of the circulation system 135, selection of heater components such as a blower or heat exchanger, altitude of location of the managed water system 190 (or portions thereof), gas pressure, quality of gas, and age of the equipment of the circulation system 135, the heating system 170, and/or the treatment system 175.

Equation (2): $HR=(IR \times Eff) \div 3600$, where HR is a rate of heat expressed in BTUs per second, IR is the input rate of the fuel (e.g., natural gas) used by the heater of the heating system 170, Eff is the result of Equation (1), and 3600 is the amount of seconds in an hour. If a user 150 want to have the HR expressed in terms of some other amount of time (e.g., BTUs per hour, BTUs per minute), this constant can be adjusted accordingly. This Equation (2) is designed to simplify the monitoring process by expressing the input rate of the equipment in seconds, because for every second that the equipment runs, the burned fuel delivers a HR (e.g., in BTU/per second) of energy.

Equation (3): $T_{rise}=RT_{final}-RT_{initial}$, where $T_{rise}$ is the net rise in temperature (e.g., in degrees F.), $RT_{final}$ is the final return temperature (i.e., the target temperature), and $RT_{initia}$ is the initial return temperature. While $T_{rise}$ can typically expected to be 1° F., other rises in temperature (e.g., 2° F.) can be used, as when a sensor device 151 is not reading consistently. In some cases, this Equation (3) is solved multiple times (e.g., 10 samples), sometimes calculated as a moving average, to help ensure that there are no erroneous readings or calculations. This Equation (3) removes the bias or requirement of knowing the size of the vessel 119 and/or the size of the heating equipment in the heating system 170.

Equation (4): $HR_{Total}=HR \times t$, where $HR_{Total}$ is the total amount of heat provided to the heating system 170 per unit of time (t), and where HR is the result of Equation (2) above. In some cases, t in this Equation (4) can be the amount of time it takes to reach $RT_{final}$ from $RT_{initial}$ in Equation (3).

Equation (5): $V=HR_{Total} \div (8.33 \times T_{rise})$, where V is the volume of the body of water 180 (or more specifically the volume of the vessel 119), $HR_{Total}$ is the result of Equation (4), and $T_{rise}$ is the result of Equation (3).

Equation (6): $T_{Total}=T_{Target}-T_{initial}$, where $T_{Target}$ is the desired temperature of the body of water 180, and where $T_{initial}$ is the initial temperature of the body of water 180 (before heating).

Equation (7): $T_H=[(V \times 8.33 \times T_{Total}) \div (IR \times Eff)] \times 60$, where $T_H$ is the total time to heat the body of water 180, V is is the result of Equation (5), $T_{Total}$ is the result of Equation (6), IR is the input rate of the fuel used by the heater of the heating system 170, and Eff is the result of Equation (1). By using a multiplier of 60, $T_H$ is expressed in minutes. To express $T_H$ in some other unit of time, another appropriate number can be used.

In step 346, a communication is sent when the body of water 180 reaches the target temperature. The communication can be sent by the controller 104 to a user 150. The controller 104 can communicate in one or more of any number of ways. For example, the controller 104 can emit, through a speaker, an audible notification. As another example, the controller 104 can send a SMS message to the mobile device of one or more users 150. As yet another example, the controller 104 can post a message on a display. As still another example, the controller 104 can send an email to one or more users 150. The controller 104 can use the transceiver 124 when communicating.

The controller 104 can additionally or alternatively send one or more other communications. For example, the controller 104 can send a communication shortly after the time the request in step 341 is made as to approximately what time the target temperature of the body of water 180 should be reached. As another example, the controller 104 can send a communication when there is some amount of time (e.g., one hour, 30 minutes) before the target temperature is reached. When step 346 is complete, the process proceeds to the END step.

As an example, if the controller 104, using one or more sensor devices 151, stored data 134, and/or one or more algorithms 133, determines that the initial temperature of the body of water 180 is 65° F., the BTU input of the heating system 170 is 200,00 BTU, the amount of time it takes for the body of water 180 to rise 1° F. is 300 seconds, and the target temperature of the body of water 180 is 85° F., then the controller 104 can use this information, in conjunction with one or more algorithms 133, to determine that the vessel 119 holds 1699.77 gallons, and that it will take 1.68582 hours (which is equal to 101.149 minutes or 6068.97 seconds) to heat the body of water 180 to 85° F. This is shown using Equation (7) as follows: $T_H$=[(1680.67× 8.33 ×(85−65))÷(200000×0.84)] ×60=101.149 minutes.

Figure 4:
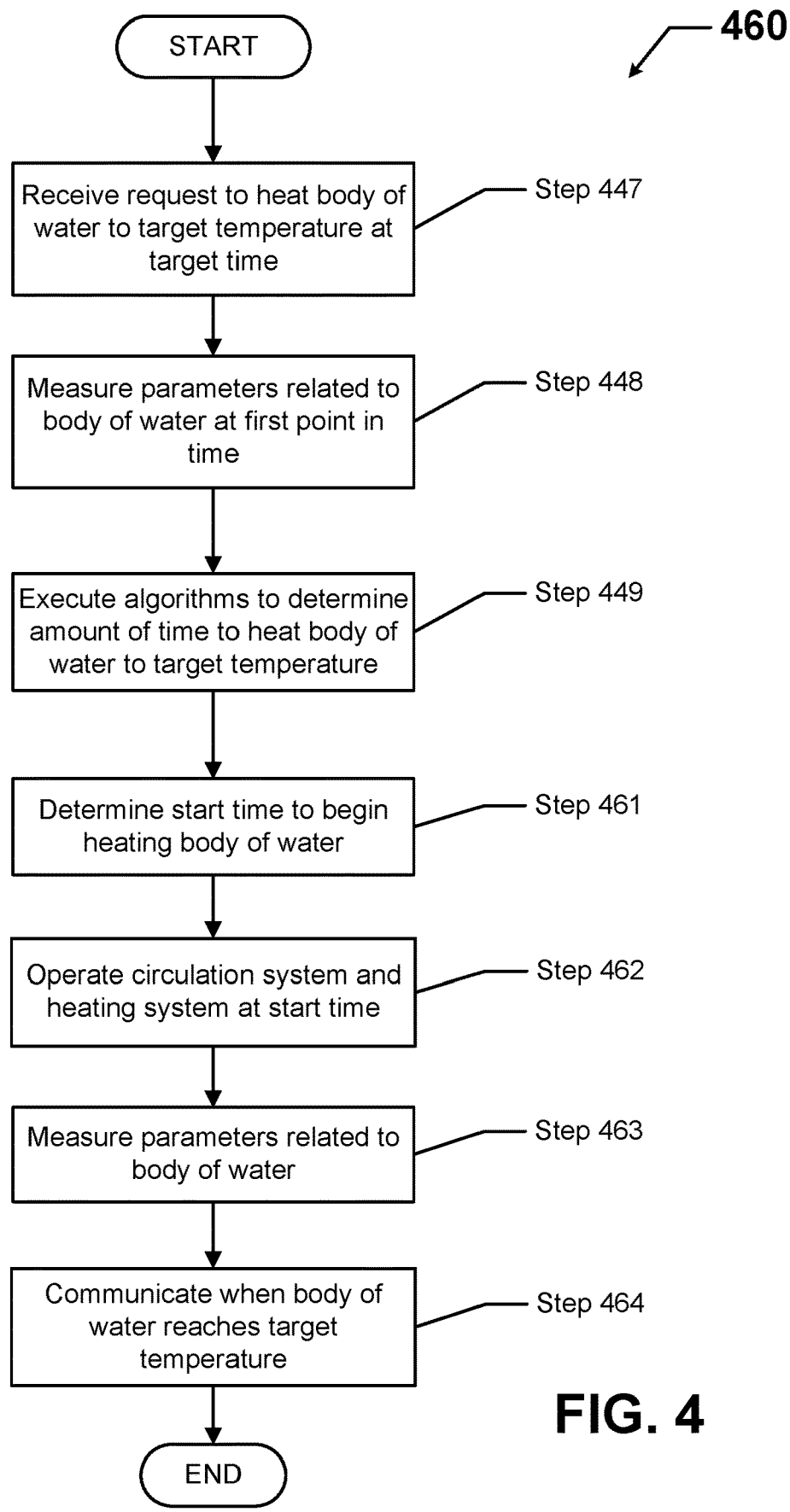

The method 460 of FIG. 4 describes how example embodiments can heat a body of water 180 to a target temperature at a target time. The example method 460 of FIG. 4 begins at the START step and proceeds to step 447, where a request to heat the body of water 180 to the target temperature at the target time is received. The request can be made by a user 150. The request can be received by the controller 104. The request can be made using one or more of any suitable communication methods, including but not limited to an email, a text message, a verbal statement, and an input on a user interface of the controller 104. The request can be received by the controller 104 using the application interface 126.

In step 448, one or more parameters related to the body of water 180 are measured at a first point in time. The parameters can be measured by one or more of the sensor devices 151 (e.g., a temperature sensor 158, a flow sensor 156). If the same parameter is measured by multiple sensor devices 151, then those sensor devices 151 can be placed at different locations within the managed water system 190. For example, one temperature sensor 158 can be placed near a part of the piping system 184 that feeds water to the vessel 119, thereby measuring the temperature of the water that flows into the vessel 119, while another temperature sensor 158 can be placed near a part of the piping system 184 that removes water to the vessel 119, thereby measuring the temperature of the water that flows out of the vessel 119. As the body of water 180 is being heated by the heating system 170, the measurements made by these two temperature sensors 158 can be different from each other, as when the set point value is higher than the temperature of the body of water 180 in the vessel 119.

A sensor device 151 can measure a parameter based on instructions received by the controller 104. Alternatively, a sensor device 151 can continually measure a parameter without instructions from the controller 104. Once the parameters are measured, the sensor devices 151 can send the measurements to the controller 104. A parameter measured by a sensor device 151 can vary, as can the number of sensor devices 151. For example, at least one temperature sensor 158 can be used in this step 448. If multiple temperature sensors 158 are used, then the measured temperature values can be averaged, treated independently, and/or processed in any other suitable way.

The time at which the parameters are measured can be marked or tracked by the timer 110. The time can be a specific point in time, a period of time (e.g., 10 minutes from when the request of step 447 is received), or some other element of time. The first point in time at which the parameters are measured can be before the implementation of step 449. In addition, or in the alternative, the first point in time at which the parameters are measured can be at the time of, or after, the implementation of step 449.

In step 449, multiple algorithms 133 are executed to determine the amount of time it will take to heat the body of water 180 to the target temperature. The algorithms 133 can be stored in the storage repository 130. The algorithms 133 can be executed (performed) by the controller 104. Executing the algorithms 133 requires some or all of the measurements made by the sensor devices 151 and, in some cases, the set point (target temperature). An example of some algorithms 133 that can be solved sequentially are listed above with respect to step 345 of the method 340 of FIG. 3. Alternatively, other algorithms 133 can be used.

In step 461, the start time to begin heating the body of water 180 is determined. The determination can be made by the controller 104. For example, if the ultimate result of the algorithms 133 executed in step 449 is that it will take 2 hours to heat the body of water 180 to the target temperature, then the controller determines that the circulation system 135 and the heating system 170 should be started 2 hours before the target time. In step 462, when the start time as determined in step 461 is reached, then the circulation system 135 and the heating system 170 are started. The circulation system 135 and the heating system 170 can be started by the controller 104. The circulation system 135 and the heating system 170 are operated at the same time, usually by turning on the heating system 170 after the circulation system 135 is operating.

In step 463, one or more parameters related to the body of water 180 are measured as the body of water 180 is being heated. The parameters measured in this step 463 can be the same as, or different than, the parameters measured in step 448. Similarly, the sensor devices 151 used to measure the parameters in this step 463 can be the same as, or different than, the sensor devices 151 used to measure the parameters in step 448. Once the parameters are measured, the sensor devices 151 can send the measurements to the controller 104.

In step 464, a communication is sent when the body of water 180 reaches the target temperature. The communication can be sent by the controller 104 to a user 150. The controller 104 can communicate in one or more of any number of ways. For example, the controller 104 can emit, through a speaker, an audible notification. As another example, the controller 104 can send a SMS message to the mobile device of one or more users 150. As yet another example, the controller 104 can post a message on a display. As still another example, the controller 104 can send an email to one or more users 150. The controller 104 can use the transceiver 124 when communicating.

The controller 104 can additionally or alternatively send one or more other communications. For example, the controller 104 can send a communication shortly after the time the request in step 447 is made as to approximately when the circulation system 135 and the heating system 170 will be started so that the target temperature of the body of water 180 is reached at the target time. As another example, the controller 104 can send a communication when there is some amount of time (e.g., one hour, 30 minutes) before the target temperature is reached. When step 464 is complete, the process proceeds to the END step.

Figure 5:
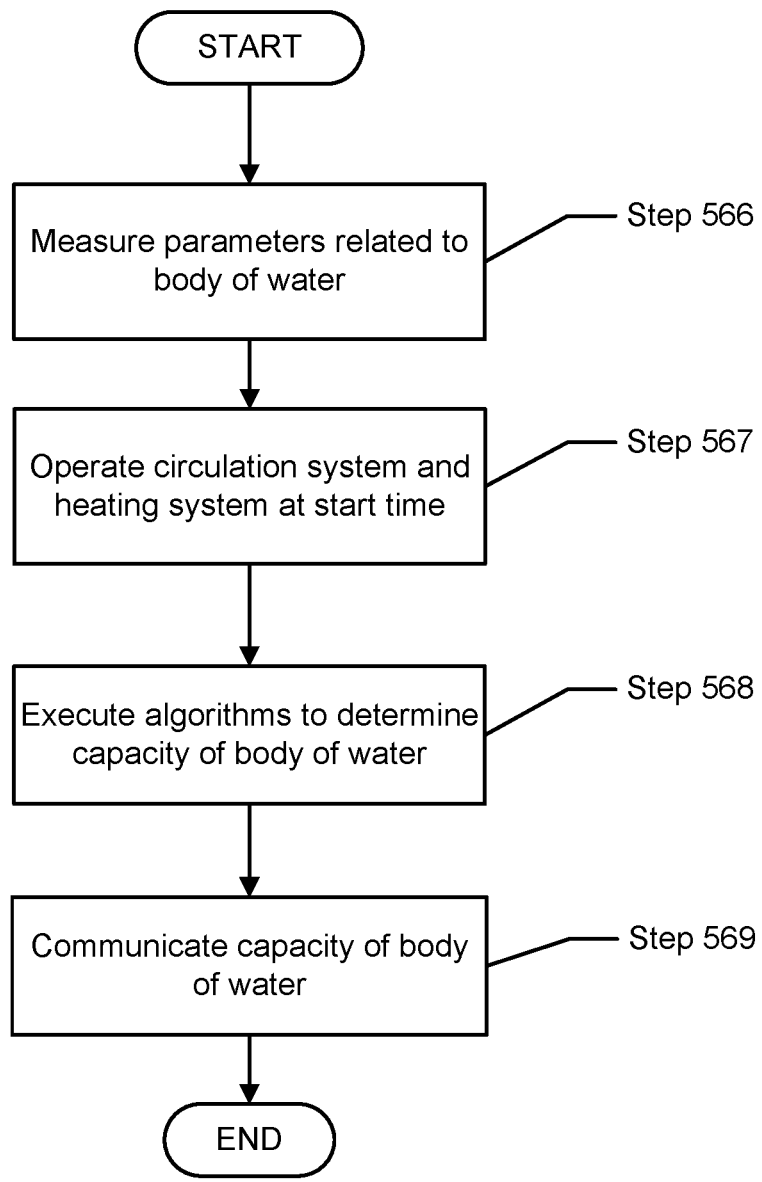

The method 565 of FIG. 5 describes how example embodiments can determine the capacity of a vessel 119 holding a body of water 180. The example method 565 of FIG. 5 begins at the START step and proceeds to step 566, where one or more parameters related to the body of water 180 are measured. In some cases, the parameters are measured as the body of water 180 is being heated by the heating system 170 and/or circulated by the circulation system 135. In some cases, a parameter is measured with reference to a point in time or a period of time using the timer 110.

The parameters can be measured by one or more of the sensor devices 151 (e.g., a temperature sensor 158, a flow sensor 156). If the same parameter is measured by multiple sensor devices 151, then those sensor devices 151 can be placed at different locations within the managed water system 190. For example, one temperature sensor 158 can be placed near a part of the piping system 184 that feeds water to the vessel 119, thereby measuring the temperature of the water that flows into the vessel 119, while another temperature sensor 158 can be placed near a part of the piping system 184 that removes water to the vessel 119, thereby measuring the temperature of the water that flows out of the vessel 119.

A sensor device 151 can measure a parameter based on instructions received by the controller 104. Alternatively, a sensor device 151 can continually measure a parameter without instructions from the controller 104. Once the parameters are measured, the sensor devices 151 can send the measurements to the controller 104. The parameter measured by a sensor device 151 can vary, as can the number of sensor devices 151. For example, at least one temperature sensor 158 can be used in this step 566. If multiple temperature sensors 158 are used, then the measured temperature values can be averaged, treated independently, and/or processed in any other suitable way.

In step 567, the circulation system 135 and the heating system 170 are started. The circulation system 135 and the heating system 170 can be started by the controller 104. The circulation system 135 and the heating system 170 are operated at the same time, usually by turning on the heating system 170 after the circulation system 135 is operating.

In step 568, multiple algorithms 133 are executed to determine the capacity of the vessel 119 holding the body of water 180. The algorithms 133 can be stored in the storage repository 130. The algorithms 133 can be executed (performed) by the controller 104. Executing the algorithms 133 requires some or all of the measurements made by the sensor devices 151 and, in some cases, the set point (target temperature). An example of some algorithms 133 that can be solved sequentially are listed above with respect to step 345 of the method 340 of FIG. 3. Specifically, Equations (1) through (5), listed above, can be executed to determine the capacity of the vessel 119. Alternatively, other algorithms 133 can be used In step 569, a communication is sent as to the capacity of the vessel 119. The communication can be sent by the controller 104 to a user 150. The controller 104 can communicate in one or more of any number of ways. For example, the controller 104 can emit, through a speaker, an audible notification. As another example, the controller 104 can send a SMS message to the mobile device of one or more users 150. As yet another example, the controller 104 can post a message on a display. As still another example, the controller 104 can send an email to one or more users 150. The controller 104 can use the transceiver 124 when communicating. The controller 104 can additionally or alternatively send one or more other communications. For example, the controller 104 can send a communication shortly after the time the request in step 566 is made. When step 569 is complete, the process proceeds to the END step.

Figure 6:
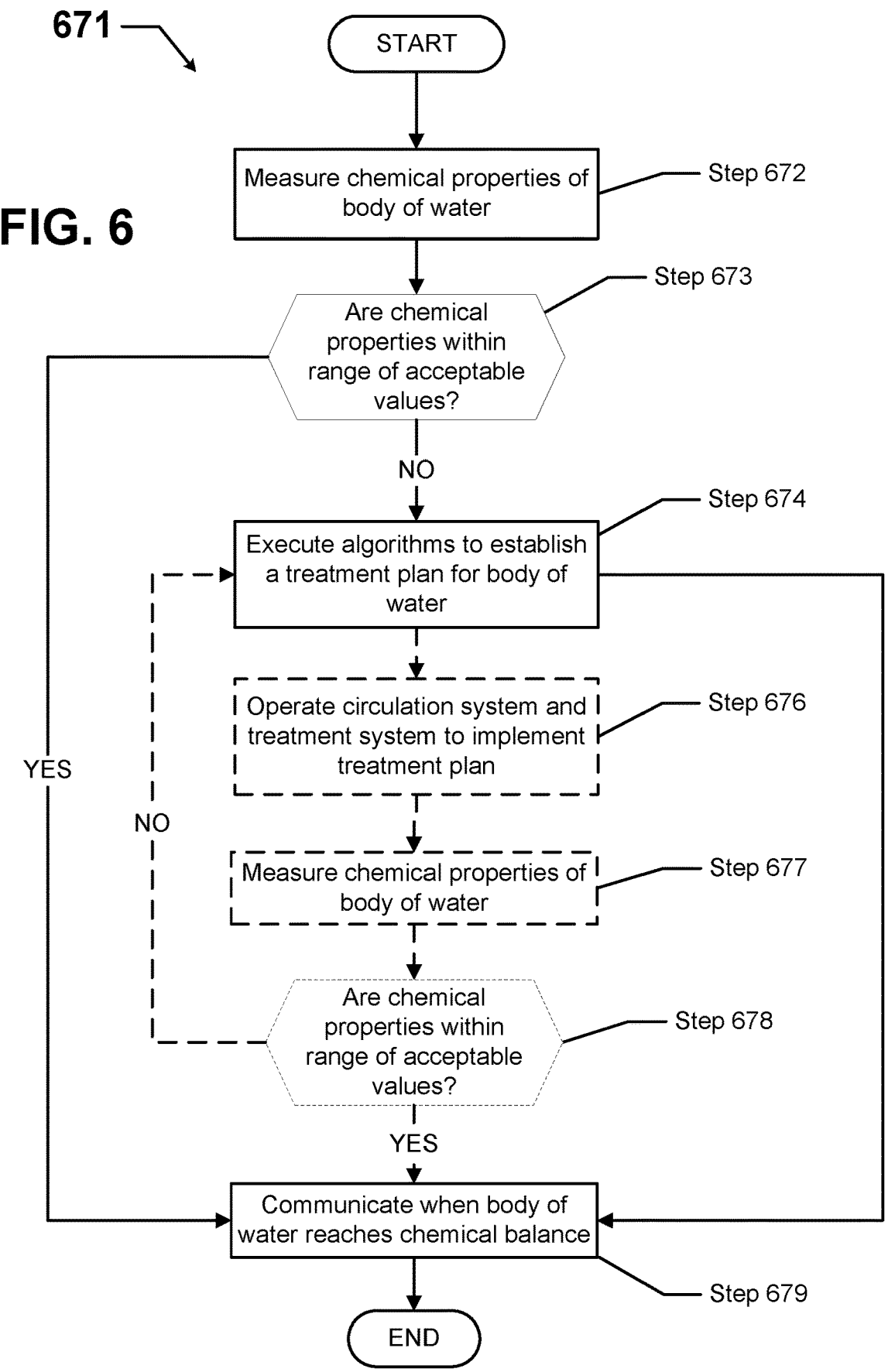

The method 671 of FIG. 6 describes how example embodiments can evaluate and, in some cases, treat the chemistry of a body of water 180. The example method 671 of FIG. 6 begins at the START step and proceeds to step 672, where the chemical properties (types of parameters) of the body of water 180 are measured. In some cases, a chemical property is measured with reference to a point in time or a period of time using the timer 110. In some cases, step 672 can be initiated automatically (e.g., based on the passage of some period of time). Alternatively, step 672 can be initiated by a request from a user 150.

The chemical properties can be measured by one or more of the sensor devices 151 (e.g., a pH sensor, a chlorine sensor). If the same chemical property is measured by multiple sensor devices 151, then those sensor devices 151 can be placed at different locations within the managed water system 190. For example, one pH sensor can be placed near one end of the vessel 119, while another pH sensor can be placed near the opposite end of the vessel 119. In such a case, these values can be averaged to establish the pH of the body of water 180.

A sensor device 151 can measure a chemical property based on instructions received by the controller 104. Alternatively, a sensor device 151 can continually measure a chemical property without instructions from the controller 104. Once the chemical properties are measured, the sensor devices 151 can send the measurements to the controller 104. The chemical property measured by a sensor device 151 can vary, as can the number of sensor devices 151. For example, at least one chlorine sensor can be used in this step 672. If multiple sensors 158 are used to measure a single chemical property, then the measured values can be averaged, treated independently, and/or processed in any other suitable way.

In step 673, a determination is made as to whether any chemical properties that fall outside a range of acceptable values. This determination can be made by the controller 104, in some cases with the assistance of the optional treatment system 175. The range of acceptable values for each chemical property can be part of the stored data 134 of the storage repository 130. If one or more of the chemical properties fall outside a corresponding range of acceptable values, then the process proceeds to step 674. If none of the chemical properties fall outside a corresponding range of acceptable values, then the process proceeds to step 679.

In step 674, one or more algorithms 133 are executed to establish a treatment plan for the body of water 180. A treatment plan includes the amount, type, and order of chemicals to be added to the body of water 180. These algorithms 133 can be solved using such factors as actual chemical property values, acceptable (target) chemical property values, types and amounts of chemical in inventory with the optional treatment system 175, pumping capacity of the circulation system 135, and time of day (e.g., amount of daylight remaining). The determinations of this step 674 can be made by the controller 104. If there is an optional treatment system 175, the process proceeds to step 676. If there is no an optional treatment system 175, the process proceeds to step 679.

In optional step 676, the circulation system 135 and the treatment system 175 are started to implement the treatment plan. The circulation system 135 and the treatment system 175 can be started and controlled by the controller 104. The treatment system 175 can be operated independently of or in conjunction with the circulation system 135. For example, if chlorine tablets are added to a chlorinator within the treatment system 175, this task can be performed regardless of whether the circulation system 135 is operating. As another example, if muriatic acid is added by the treatment system 175 to the body of water 180 to lower the pH, then the circulation system 135 should be running before, during, and some period of time (e.g., 2 hours, 4 hours) after the muriatic acid is added.

In certain example embodiments, the treatment plan executed by the treatment system 175 can be a specific prescription of what types of chemicals to be added to the body of water 180, in what amount, and in what order. For example, a treatment plan can include adding 26 ounces of muriatic acid to the body of water 180 while the circulation pump of the circulation system 135 is operating at full speed. Then, after 2 hours, two 3 inch chlorine tablets should be added to the chlorinator of the treatment system 175. Then, after 10 minutes, one pound of shock (with a minimum of 60% active chlorine) is added to the body of water 180 in the vessel 119. After running the circulation pump of the circulation system 135 for 12 hours at half speed, the circulation pump of the circulation system 135 is turned off. Throughout the treatment plan, the controller 104 can control at least some, if not all, functions performed by the circulation system 135 and the treatment system 175.

In step optional 677, the chemical properties (types of parameters) of the body of water 180 are measured. This step can be substantially the same as step 672. Further, the chemical properties measured in this step can be associated with the chemicals added to the body of water 180 in step 676. In some cases, this step can be performed iteratively with step 676. For example, after one step is performed in the treatment plan in step 676, one or more chemical properties are measured in this step 677 to be sure that the next step in the treatment plan should be executed. If not, then a revised treatment plan can be generated and implemented by the controller 104.

In optional step 678, a determination is again made as to whether any chemical properties that fall outside a range of acceptable values. This determination can be made by the controller 104, in some cases with the assistance of the treatment system 175. The range of acceptable values for each chemical property can be part of the stored data 134 of the storage repository 130. If one or more of the chemical properties fall outside a corresponding range of acceptable values, then the process reverts to step 674. If none of the chemical properties fall outside a corresponding range of acceptable values, then the process proceeds to step 679.

In step 679, a communication is sent when the body of water 180 reaches chemical balance. The communication can be sent by the controller 104 to a user 150. The controller 104 can communicate in one or more of any number of ways. For example, the controller 104 can emit, through a speaker, an audible notification. As another example, the controller 104 can send a SMS message to the mobile device of one or more users 150. As yet another example, the controller 104 can post a message on a display. As still another example, the controller 104 can send an email to one or more users 150. The controller 104 can use the transceiver 124 when communicating. The controller 104 can additionally or alternatively send one or more other communications. When step 679 is complete, the process proceeds to the END step.

Figure 7:
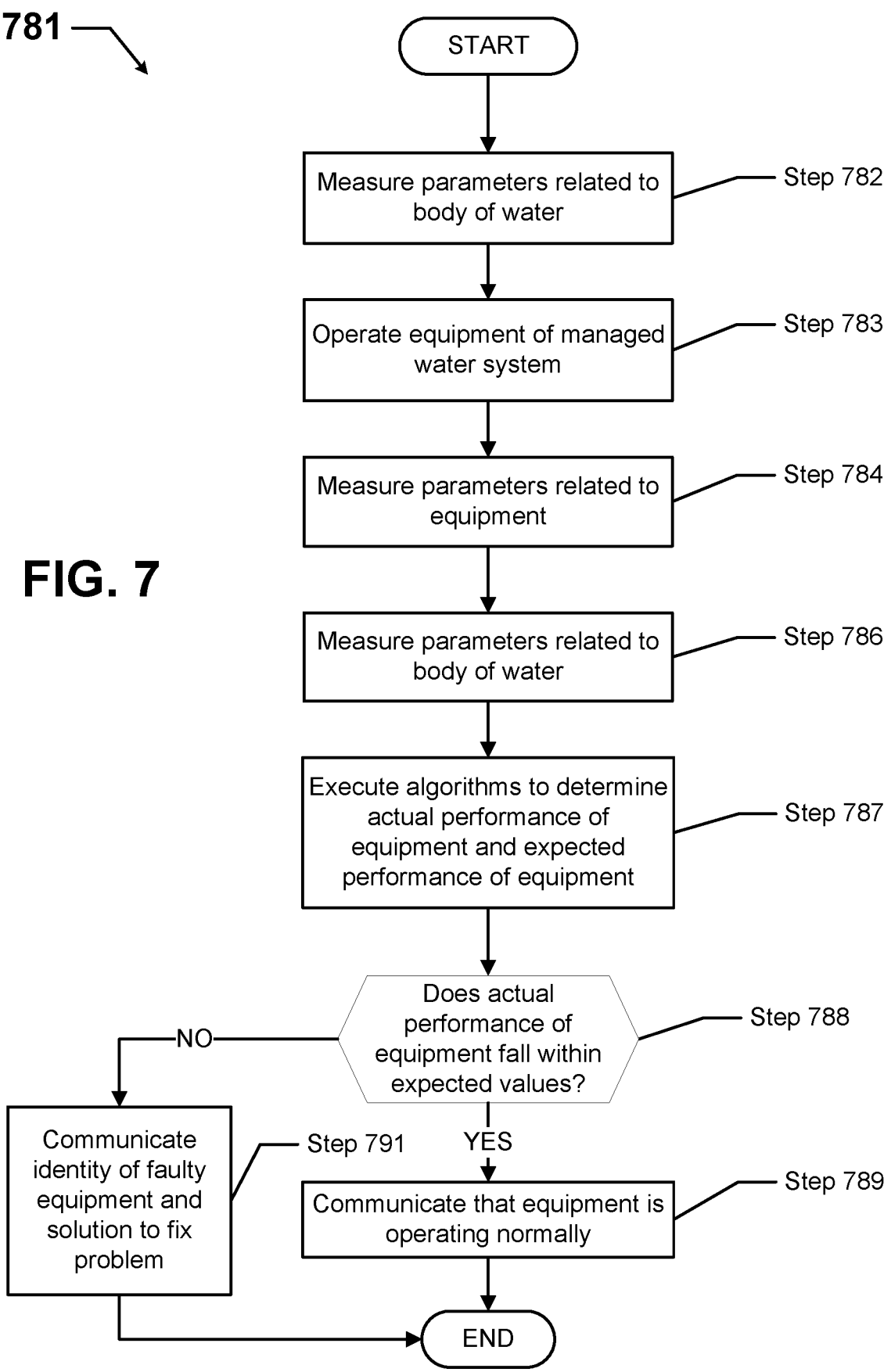

The method 781 of FIG. 7 describes how example embodiments can evaluate some or all of the equipment of the managed water system 190. The example method 781 of FIG. 7 begins at the START step and proceeds to step 782, where one or more parameters related to the body of water 180 are measured. In some cases, the parameters are measured as the body of water 180 is being heated by the heating system 170, treated by the treatment system 175, and/or circulated by the circulation system 135. In some cases, a parameter is measured with reference to a point in time or a period of time using the timer 110.

The parameters can be measured by one or more of the sensor devices 151 (e.g., a temperature sensor 158, a flow sensor 156, the energy metering module 111). If the same parameter is measured by multiple sensor devices 151, then those sensor devices 151 can be placed at different locations within the managed water system 190. For example, one temperature sensor 158 can be placed near a part of the piping system 184 that feeds water to the vessel 119, thereby measuring the temperature of the water that flows into the vessel 119, while another temperature sensor 158 can be placed near a part of the piping system 184 that removes water to the vessel 119, thereby measuring the temperature of the water that flows out of the vessel 119. A sensor device 151 can measure a parameter based on instructions received by the controller 104. Alternatively, a sensor device 151 can continually measure a parameter without instructions from the controller 104. Once the parameters are measured, the sensor devices 151 can send the measurements to the controller 104. The parameter measured by a sensor device 151 can vary, as can the number of sensor devices 151.

In step 783, the equipment of the managed water system 190 is operated. The equipment can include some or all of the circulation system 135 (e.g., a pump motor, a valve), the heating system 170 (e.g., a heater), and/or the treatment system 175 (e.g., a chemical dispensing module). The equipment of the managed water system 190 can be operated (e.g., started, controlled) by the controller 104. The timing of when certain equipment is operated relative to other equipment is determined by the controller 104. The operation of some or all of the equipment can be modified by the controller 104 over time. For example, if a pump motor of the circulation system 135 has variable speed capability, then, the controller 104 can vary the speed of the motor over time.

In step 784, one or more parameters related to the equipment of the managed water system 190 are measured. In some cases, the parameters are measured as the equipment is operating. In some cases, a parameter is measured with reference to a point in time or a period of time using the timer 110. The parameters can be measured by one or more of the sensor devices 151 (e.g., a temperature sensor 158, a flow sensor 156, the energy metering module 111). If the same parameter is measured by multiple sensor devices 151, then those sensor devices 151 can be placed at different locations within the managed water system 190. A sensor device 151 can measure a parameter based on instructions received by the controller 104. Alternatively, a sensor device 151 can continually measure a parameter without instructions from the controller 104. Once the parameters are measured, the sensor devices 151 can send the measurements to the controller 104. The parameter measured by a sensor device 151 can vary, as can the number of sensor devices 151.

In step 786, one or more parameters related to the body of water 180 are measured. The parameters measured in this step 786 can be the same as, or different than, the parameters measured in step 782. Similarly, the sensor devices 151 used to measure the parameters in this step 786 can be the same as, or different than, the sensor devices 151 used to measure the parameters in step 782. Once the parameters are measured, the sensor devices 151 can send the measurements to the controller 104.

In step 787, one or more algorithms 133 are executed to determine the actual performance of the equipment of the managed water system 190 and the expected performance of the equipment. The algorithms 133 can be executed by the controller 104. The equipment can include some or all of the circulation system 135 (e.g., a pump motor, a valve), the heating system 170 (e.g., a heater), and/or the treatment system 175 (e.g., a chemical dispensing module). The expected performance of the equipment can be based on, for example, nameplate data for the equipment (as stored in stored data 134), historical performance of the equipment (as stored in stored data 134), results of previously-executed algorithms 133 (as stored in stored data 134), historical performance of similar equipment in other systems (as stored in stored data 134), and manufacturer data (as stored in stored data 134). The actual performance of the equipment can be determined based on the measurements made by the sensor devices 151 in step 782, step 784, and/or step 786.

In step 788, a determination is made as to whether the actual performance of the equipment falls within expected values. The determination can be made by the controller 104. The expected values can be based on the expected performance of the equipment. For example, if a pump motor of the circulation system 135 is found by the controller 104 to be 5A when the motor is running at full speed, then the controller 104 may determine that the range of expected (or accepted) values is between 4.5A and 5.5A. In this way, if the pump motor is currently drawing 5.7A at full speed, then the controller 104 determines that the performance of the pump motor is outside of its expected values. If the actual performance of the equipment falls within expected values, then the process proceeds to step 789. If the actual performance of the equipment falls outside of the expected values, then the process proceeds to step 791.

In step 789, a communication is sent that the equipment is operating normally. The communication can be sent by the controller 104 to a user 150. The controller 104 can communicate in one or more of any number of ways. For example, the controller 104 can emit, through a speaker, an audible notification. As another example, the controller 104 can send a SMS message to the mobile device of one or more users 150. As yet another example, the controller 104 can post a message on a display. As still another example, the controller 104 can send an email to one or more users 150. The controller 104 can use the transceiver 124 when communicating. The controller 104 can additionally or alternatively send one or more other communications. The communication can include additional information, including but not limited to identification of the specific equipment, the actual operating values, the expected operating values, and any commentary about the relative similarities and/or differences between the two. When step 789 is complete, the process proceeds to the END step.

In step 791, a communication is sent identifying faulty equipment and, in some cases, one or more solutions to fix the problem with the equipment. The communication can be sent by the controller 104 to a user 150. The communication can be sent in any of a number of ways, as discussed above with respect to step 789. If the controller 104 is configured to propose one or more solutions to fixing the faulty equipment, some examples of such solutions can include, but is not limited to, locating new or used replacement equipment, ordering equipment, scheduling installation of the equipment, and reporting faulty equipment under warranty to the manufacturer of the equipment. When step 791 is complete, the process proceeds to the END step.

Figure 8:
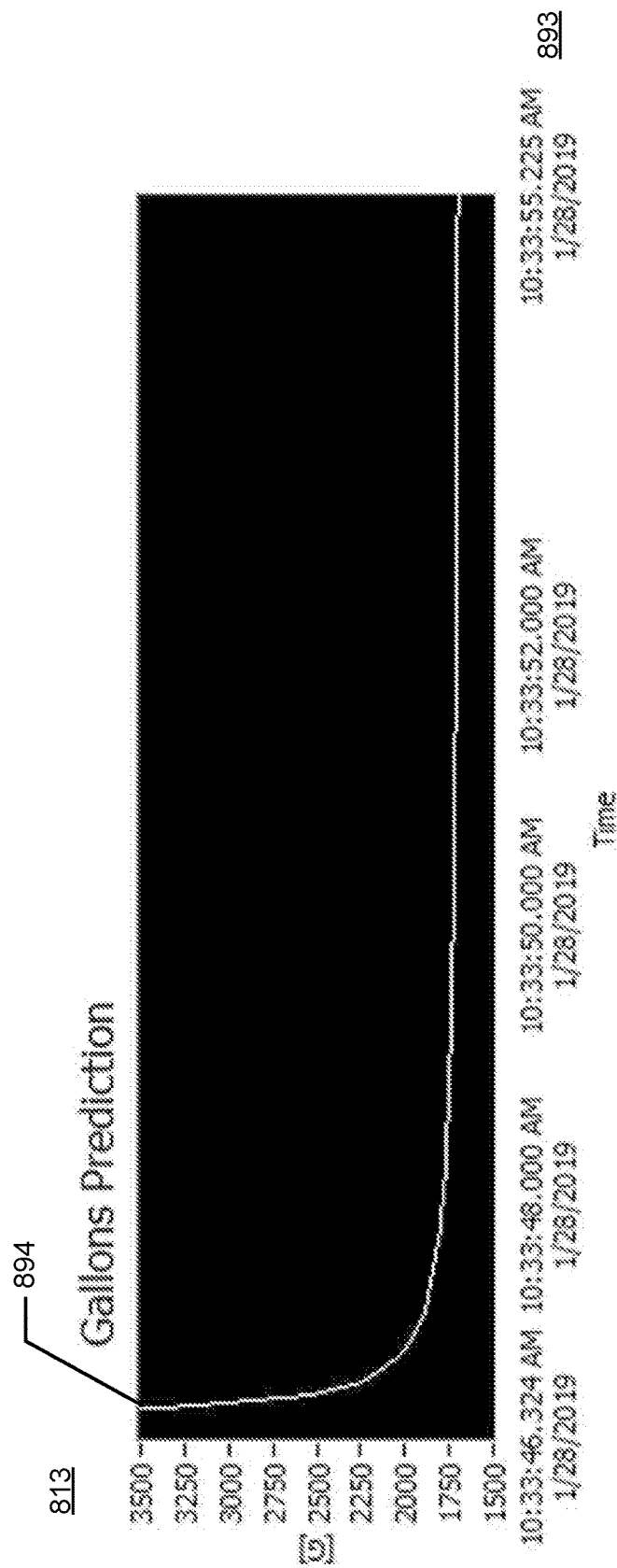
FIG. 8 shows a graph of an amount of time it takes to calculate the volume of a vessel in accordance with certain example embodiments.

In some cases, the controller 104 needs only a short amount of time to determine any of the values discussed above with respect to FIGS. 3 through 7. For example, FIG. 8 shows a graph 892 of an amount of time it takes to calculate the volume of a vessel (e.g., vessel 119) in accordance with certain example embodiments. The graph 892 shows a plot 894 of volume 813 (in gallons) in the vertical axis versus time 893 in the horizontal axis. In this example, the plot 894 reaches a steady state of about 1750 gallons after about 4 seconds.

Example embodiments can be used to provide information and control with respect to any of a number of aspects of one or more managed water systems. Example embodiments can manage and control a circulation system, a piping system, a heating system, a treatment system, and/or any other sub-system within the managed water system. Example embodiments can determine the size of a vessel holding a body of water. Example embodiments can determine how long it will take to heat a body of water to a target temperature. Example embodiments can determine when to start heating a body of water so that the body of water reaches a target temperature at a target time. Example embodiments can be used to determine the chemical parameters of a body of water, generate a chemical treatment plan, and/or implement a chemical treatment plan. Example embodiments can be used to evaluate equipment of the managed water system and, in some cases, develop and/or implement an action plan to replace failed or failing equipment. Example embodiments can receive input and/or information from any of a number of sensor devices and/or users to make its determinations. Example embodiments can lower costs, improve efficiency, and increase the useful life of a managed water system, including its various components.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A managed water system, comprising:
   a body of water contained in a vessel;
   at least one sensor device that measures at least one parameter associated with the body of water;
   a circulation system that circulates the body of water relative to the vessel;
   a first ancillary system joined in a closed loop with the vessel and the circulation system by a piping system, wherein the first ancillary system alters the body of water as the body of water flows through the first ancillary system; and
   a controller communicably coupled to the at least one sensor device and the circulation system, wherein the controller:
   controls the circulation system;
   receives a plurality of measurements of the at least one parameter made by the at least one sensor device;
   evaluates the plurality of measurements using a plurality of algorithms; and
   communicates a result of evaluating the plurality of measurements.

2. The managed water system of claim 1, wherein the plurality of measurements are received by the controller from the at least one sensor device over time.

3. The managed water system of claim 1, wherein the body of water comprises a swimming pool.

4. The managed water system of claim 1, wherein the result comprises a recommendation to upgrade equipment of the circulation system.

5. The managed water system of claim 1, wherein the at least one parameter comprises a flow rate of the body of water through the piping system disposed in the closed loop between the circulation system and the vessel.

6. The managed water system of claim 1, wherein the first ancillary system comprises a heating system that heats the body of water, and wherein the controller comprises a timer.

7. The managed water system of claim 6, wherein the at least one parameter comprises a temperature of the body of water, wherein the plurality of algorithms uses the temperature of the body of water at a first time and the temperature of the body of water at a second time, wherein the first time and the second time are measured by the timer.

8. The managed water system of claim 7, wherein the result comprises a capacity of the vessel.

9. The managed water system of claim 7, wherein the result comprises an amount of time to heat the body of water to a target temperature.

10. The managed water system of claim 7, wherein the result comprises a time at which to begin heating the body of water to reach a target temperature at a target time.

11. The managed water system of claim 1, wherein the first ancillary system comprises a treatment system that chemically treats the body of water, and the at least one parameter measured by the at least one sensor device comprises a chemical attribute of the body of water.

12. The managed water system of claim 11, wherein the result comprises a chemical treatment plan to put water chemistry of the body of water within acceptable parameters.

13. The managed water system of claim 12, wherein the controller controls the treatment system to execute the chemical treatment plan.

14. A controller for a managed water system, comprising:
a control engine that is configured to:
control a circulation system that circulates a body of water relative to a vessel, wherein the circulation system is configured to circulate the body of water through an ancillary system that is joined in a closed loop with the vessel by a piping system, and wherein the ancillary system is configured to alter the body of water as the body of water flows through the ancillary system;
receive a plurality of measurements of at least one parameter associated with the body of water as measured by at least one sensor device;
evaluate the plurality of measurements using a plurality of algorithms; and
communicate a result of evaluating the plurality of measurements.

15. The controller of claim 14, wherein the ancillary system is a heating system and the control engine is further configured to:
control the heating system for heating the body of water while the circulation system is operating.

16. The controller of claim 14, wherein the ancillary system is a treatment system and the control engine is further configured to:
control the treatment system for chemically treating the body of water while the circulation system is operating.

17. A non-transitory computer-readable medium comprising instructions that, when executed by a hardware processor, perform a method for evaluating a portion of a managed water system, the method comprising:
controlling a circulation system that circulates a body of water relative to a vessel, wherein the circulation system is configured to circulate the body of water through an ancillary system that is joined in a closed loop with the vessel by a piping system, and wherein the ancillary system is configured to alter the body of water as the body of water flows through the ancillary system;
receiving a plurality of measurements of at least one parameter associated with the body of water as measured by at least one sensor device;
evaluating the plurality of measurements using a plurality of algorithms; and
communicating a result of evaluating the plurality of measurements.

18. The non-transitory computer-readable medium of claim 17, further comprising:
executing, using the circulation system and the ancillary system, a treatment plan for the body of water so that a problem identified in the result is corrected.

19. The non-transitory computer-readable medium of claim 17, further comprising:
adjusting the plurality of algorithms based on actual data compared to previously calculated values.

* * * * *